(12) United States Patent
Powell

(10) Patent No.: US 9,174,504 B1
(45) Date of Patent: Nov. 3, 2015

(54) LOCK AND LOAD CONTROL ARM

(71) Applicant: Douglas Hunter Powell, Eldorado Hills, CA (US)

(72) Inventor: Douglas Hunter Powell, Eldorado Hills, CA (US)

(\*) Notice: Subject to any disclaimer, the term of this patent is extended or adjusted under 35 U.S.C. 154(b) by 0 days.

(21) Appl. No.: 14/469,438

(22) Filed: Aug. 26, 2014

(51) Int. Cl.
*B60G 3/16* (2006.01)
*B60G 7/00* (2006.01)
*B60G 17/005* (2006.01)
*B60G 17/02* (2006.01)

(52) U.S. Cl.
CPC *B60G 3/16* (2013.01); *B60G 7/003* (2013.01); *B60G 7/008* (2013.01)

(58) Field of Classification Search
CPC ...... B60G 7/001; B60G 7/003; B60G 17/005; B60G 17/021; B60G 2206/11; B60G 2206/111; B60G 2206/1112; B60G 3/16; B60G 7/008
See application file for complete search history.

(56) References Cited

U.S. PATENT DOCUMENTS

| | | | | | |
|---|---|---|---|---|---|
| 1,691,959 | A | * | 11/1928 | Coleman | 267/67 |
| 1,744,558 | A | * | 1/1930 | Linn | 267/252 |
| 1,875,314 | A | * | 8/1932 | Armstrong | 267/252 |
| 1,912,308 | A | * | 5/1933 | Rayburn | 280/681 |
| 1,970,859 | A | * | 8/1934 | Lenze | 267/67 |
| 2,717,786 | A | * | 9/1955 | Prill | 280/754 |
| 2,931,663 | A | * | 4/1960 | Ferand | 280/124.136 |
| 3,036,843 | A | * | 5/1962 | Hovey | 280/124.127 |
| 3,603,575 | A | * | 9/1971 | Arlasky et al. | 267/34 |
| 4,079,922 | A | * | 3/1978 | Nicholls | 267/218 |
| 4,348,016 | A | * | 9/1982 | Milly | 267/177 |
| 4,771,996 | A | * | 9/1988 | Martinez et al. | 267/220 |
| 4,830,395 | A | * | 5/1989 | Foley | 280/124.162 |
| 5,044,614 | A | * | 9/1991 | Rau | 267/221 |
| 5,477,948 | A | * | 12/1995 | Stevens | 267/221 |
| 5,580,034 | A | * | 12/1996 | Cheng | 267/221 |
| 5,720,473 | A | * | 2/1998 | Thomas | 267/221 |
| 5,803,443 | A | * | 9/1998 | Chang | 267/221 |
| 5,820,114 | A | * | 10/1998 | Tsai | 267/202 |
| 6,827,184 | B1 | * | 12/2004 | Lin | 188/321.11 |
| 6,902,045 | B2 | * | 6/2005 | Oliver et al. | 188/321.11 |
| 7,216,861 | B1 | * | 5/2007 | LaBarbera | 267/221 |
| 7,270,222 | B1 | * | 9/2007 | Aymar | 188/285 |
| 7,293,764 | B2 | * | 11/2007 | Fang | 267/220 |
| 8,702,075 | B1 | * | 4/2014 | Moorefield | 267/177 |
| 2013/0199332 | A1 | * | 8/2013 | Powell | 74/579 R |

\* cited by examiner

*Primary Examiner* — Ruth Ilan
*Assistant Examiner* — Laura Freedman
(74) *Attorney, Agent, or Firm* — Superior IP, PLLC; Dustin L. Call

(57) ABSTRACT

A control arm for use in a vehicle suspension. The control arm includes a first connection, the first connection configured to secure the control arm to a first external device and a second connection, the second connection configured to secure the control arm to a second external device. An external force expands or contracts the distance between the first connection and the second connection within predetermined limits. The control arm also includes a mechanical bias, where the mechanical bias returns the distance between the first connection and the second connection to a set free length when the external force is removed.

20 Claims, 14 Drawing Sheets

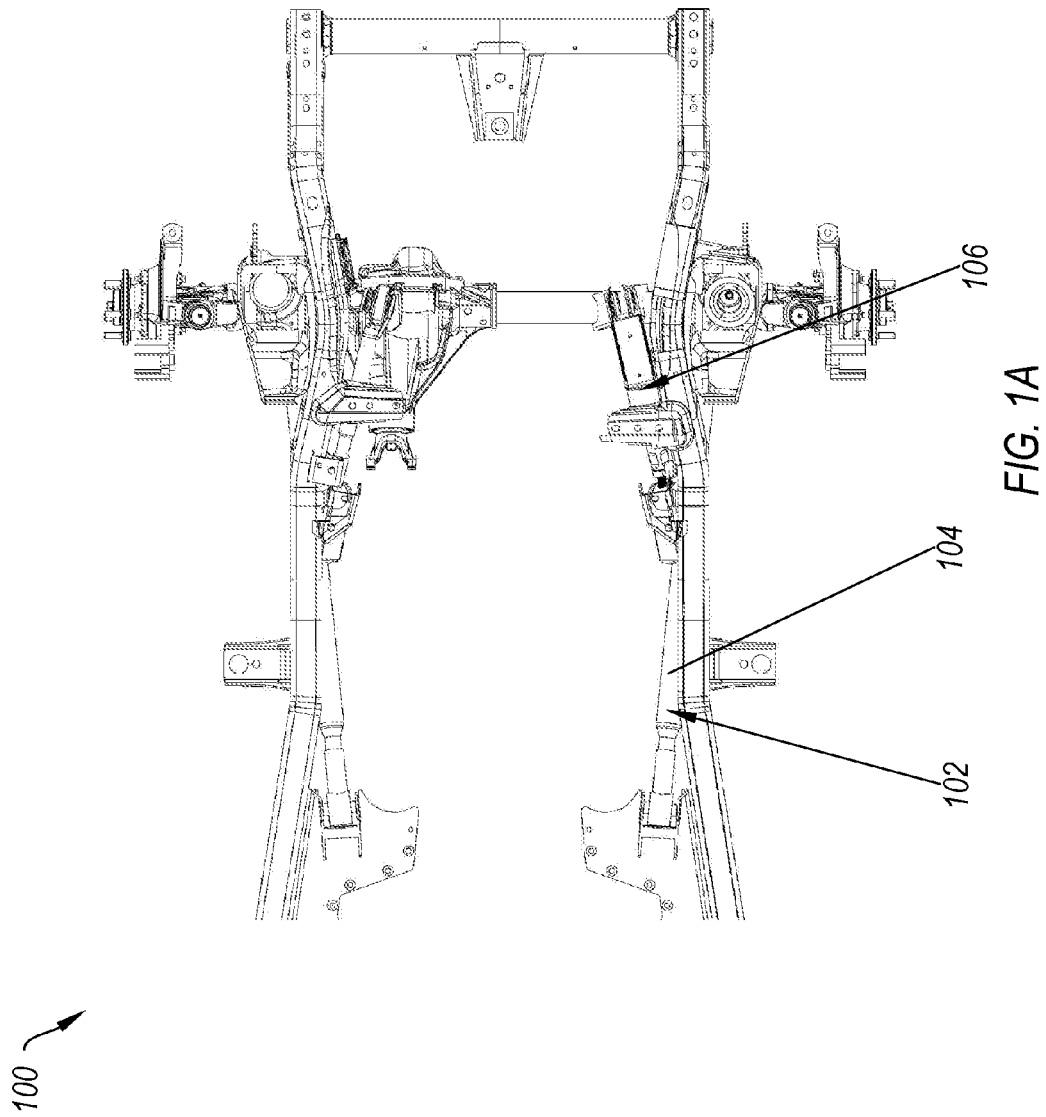

LOCK AND LOAD CONTROL ARM

CROSS-REFERENCE TO RELATED APPLICATIONS

Not applicable.

BACKGROUND OF THE INVENTION

Suspension links or control arms are a primary component of a vehicle suspension. For example, they can hold the axle of the vehicle in the proper position and prevent the axle housing from spinning when torque is applied to the axle. The connection of the suspension link between the vehicle frame and axle in part is responsible for the ride quality of the vehicle, as the connection affects the transfer of vibrations from road imperfections to the passenger compartment and the vehicles handling capabilities. In addition, the correct operation, mounting geometry and end connection of the suspension link improves the performance of the vehicle over differing terrains and speeds.

However, there are a number of drawbacks in current suspension systems utilizing multiple suspension links or control arms. In particular, different uses require different system configuration of suspension links. For example, a system of suspension links designed for everyday "on road" driving conditions requires very little flexibility (rotation, twisting and travel of the suspension links) making it very unlikely that standard driving conditions would produce binding in the joints of the system of suspension links. A more flexible system of suspension links is required for rugged all terrain driving conditions, such as off-roading. This greater flexibility requirement by definition requires greater rotation, twisting and travel of the suspension links results in binding of the joints in the suspension system.

Accordingly, there is a need in the art for a suspension link that can compress or expand a given distance against a resisting force. In addition, there is a need in the art for a suspension link in which the compression or expansion distance and bias force resisting such compression and expansion can be adjusted. In addition, there is a need in the art for a suspension link which can be made completely rigid when desired.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a control arm for use in a vehicle suspension. The control arm includes a first connection, the first connection configured to secure the control arm to a first external device and a second connection, the second connection configured to secure the control arm to a second external device. An external force expands or contracts the distance between the first connection and the second connection within predetermined limits. The control arm also includes a mechanical bias, where the mechanical bias returns the distance between the first connection and the second connection to a set free length when the external force is removed.

Another example embodiment includes a control arm for use in a vehicle suspension. The control arm includes a housing. The control arm also includes a first connection, the first connection configured to secure the control arm to a first external device and a second connection, the second connection configured to secure the control arm to a second external device. The control arm further includes a shaft configured to transmit an external force from the first connection to the second connection. An external force expands or contracts the distance between the first connection and the second connection within predetermined limits. The control arm additionally includes a mechanical bias, where the mechanical bias returns the distance between the first connection and the second connection to a set free length when the external force is removed.

Another example embodiment includes a control arm for use in a vehicle suspension. The control arm includes a housing and a plate separating the housing into a first portion and a second portion. The control arm also includes a first connection, the first connection configured to secure the control arm to a first external device and a second connection, the second connection configured to secure the control arm to a second external device. The control arm further includes a shaft configured to transmit an external force from the first connection to the second connection. The control arm additionally includes a first attachment connecting the first connection to the shaft, where the first attachment includes a threading with a first pitch and a second attachment on the end of the shaft opposite the first attachment, where the second attachment includes a threading with a second pitch. An external force expands or contracts the distance between the first connection and the second connection within predetermined limits. The control arm moreover includes a first bearing in the first portion of the housing and around the shaft and a second bearing in the second portion of the housing and threaded on the shaft at the second attachment, where the second bearing may not rotate relative to the housing. The control arm also includes a first spring in the first portion of the housing and a second spring in the second portion of the housing. Rotation of the shaft in a first direction compresses both the first spring and the second spring and rotation of the shaft in a second direction opposite the first direction expands both the first spring and the second spring. The first spring and the second spring create an adjustable mechanical bias. The mechanical bias returns the distance between the first connection and the second connection to a set free length when the external force is removed and can be adjusted to a rigid state that prevents expansion or contraction of the control arm.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 1A illustrates a top view of an example of a vehicle suspension system;

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1B:
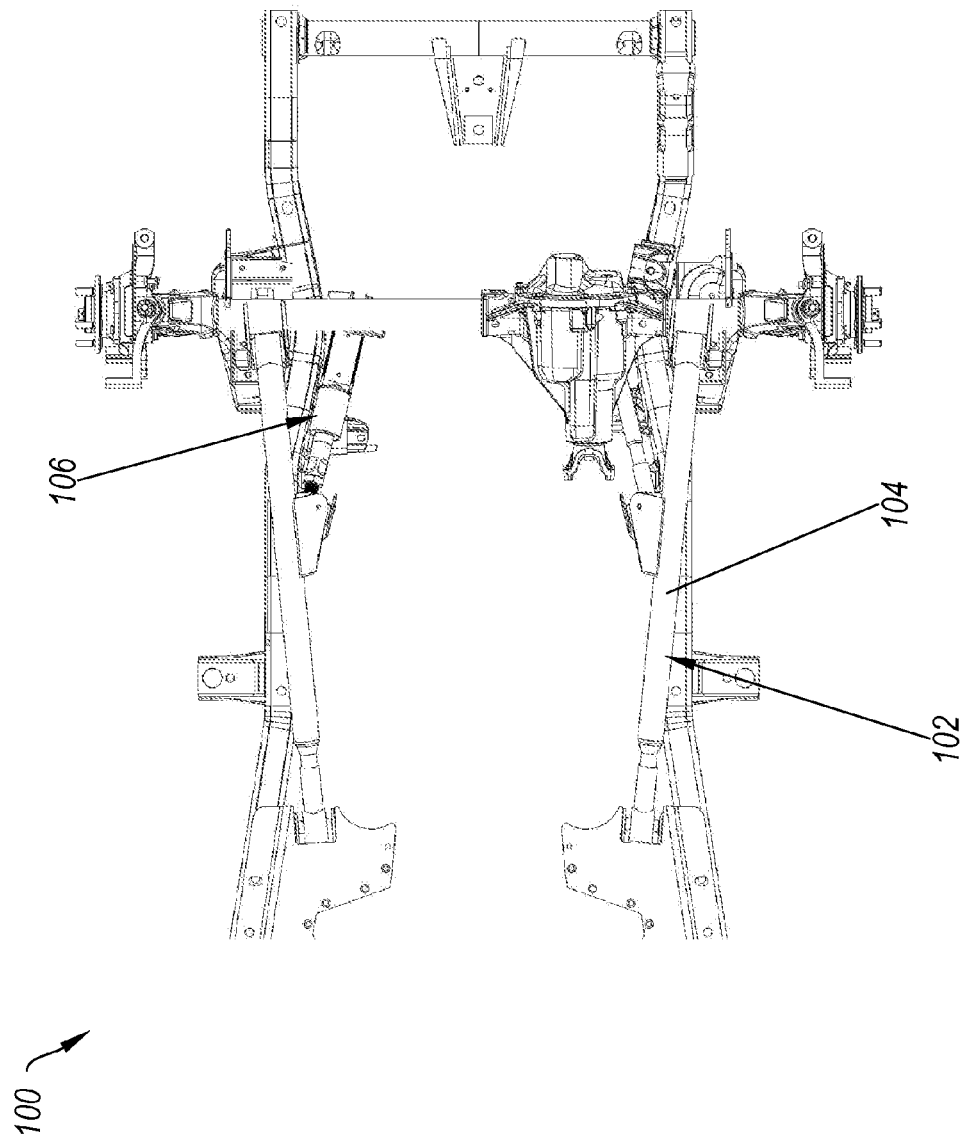
FIG. 1B illustrates a bottom view of an example of a vehicle suspension system.
Figure 1C:
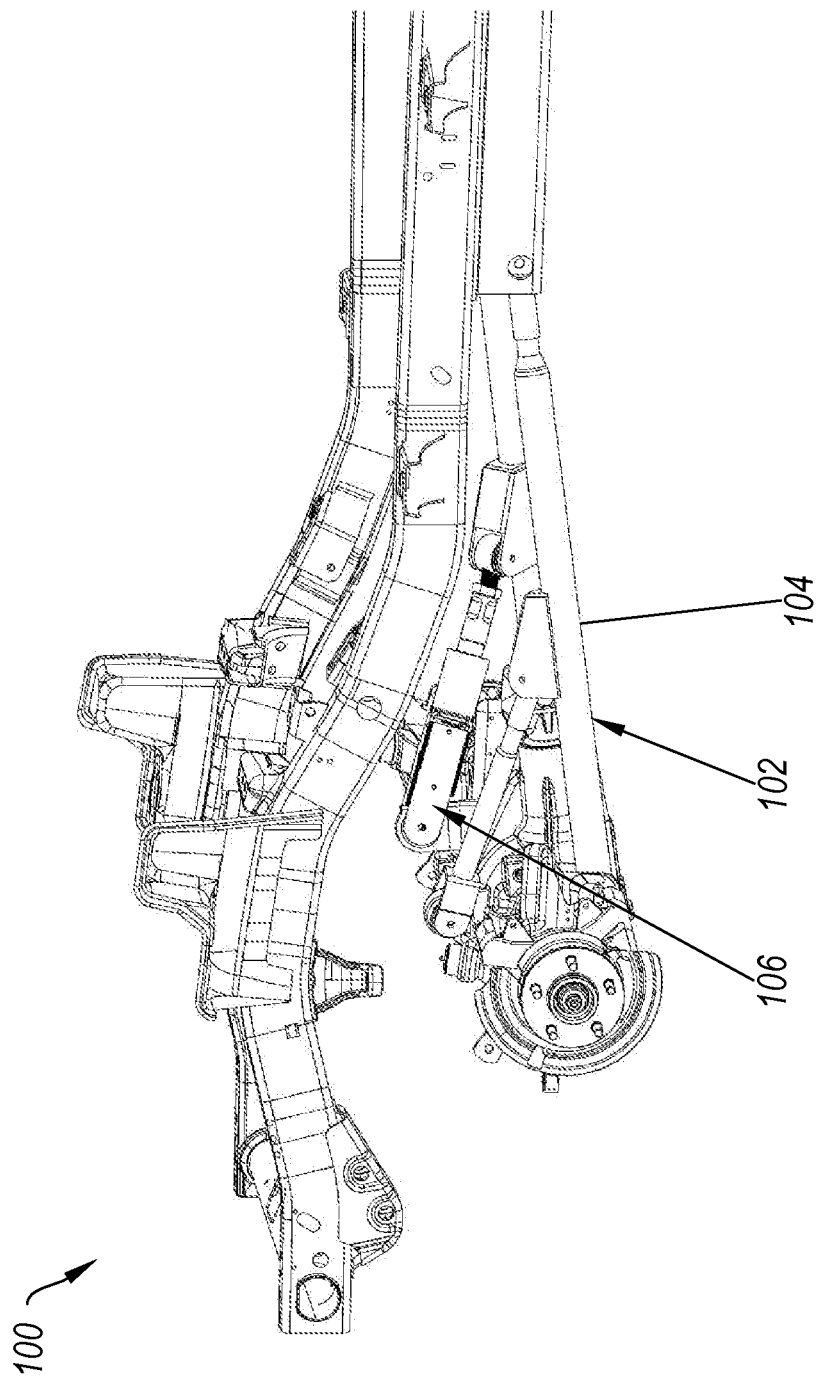
FIG. 1C illustrates a driver side view of an example of a vehicle suspension system.
Figure 1D:
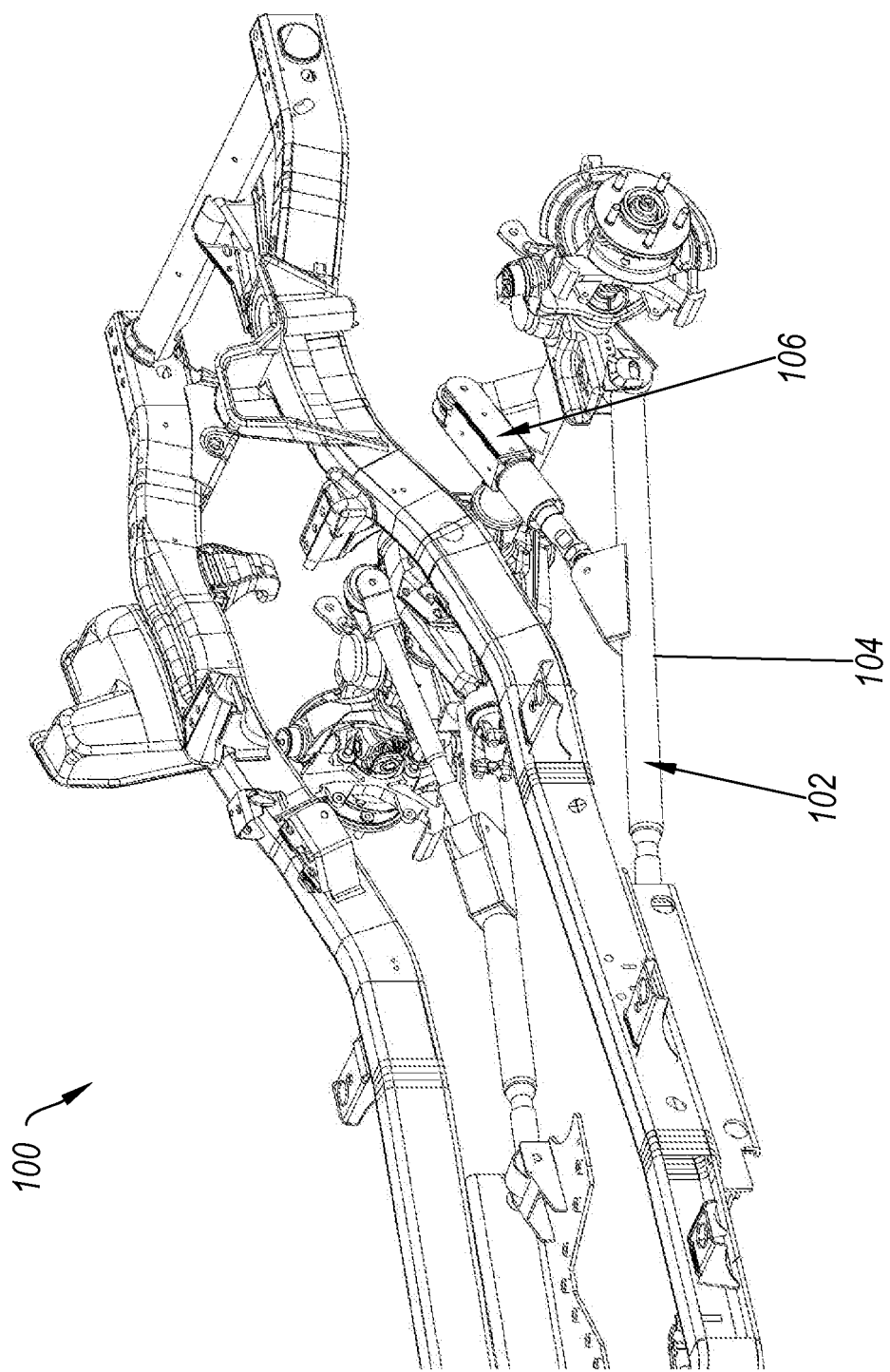
FIG. 1D illustrates a passenger side view of an example of a vehicle suspension system.

FIGS. 1A, 1B, 1C and 1D (collectively "FIG. 1") illustrate an example of a vehicle suspension system 100 in a radius arm configuration. FIG. 1A illustrates a top view of an example of a vehicle suspension system 100; FIG. 1B illustrates a bottom view of an example of a vehicle suspension system 100; FIG. 1C illustrates a driver side view of an example of a vehicle suspension system 100; and FIG. 1D illustrates a passenger side view of an example of a vehicle suspension system 100. Vehicle suspension system 100 is the term given to the system of springs, shock absorbers and linkages that connects a vehicle to its wheels and allows relative motion between the two. Vehicle suspension systems 100 serve a dual purpose—contributing to the vehicle's roadholding/handling and braking for good active safety and driving pleasure, and keeping vehicle occupants comfortable and reasonably well isolated from road noise, bumps, and vibrations, etc. These goals are generally at odds, so the tuning of vehicle suspension system 100 involves finding the right compromise. It is important for the vehicle suspension system 100 to keep the road wheel in contact with the road surface as much as possible, because all the road or ground forces acting on the vehicle do so through the contact patches of the tires.

FIG. 1 shows that the vehicle suspension system 100 can include a suspension link 102. In vehicle suspension system 100, a suspension link 102, control link or link is a suspension member that attaches at only two points. One point being the body or frame of the vehicle and the other point attaching to the knuckle, upright, axle or another link. The link pivots on either a bushing or a ball joint at each attachment point. Thus, the suspension link 102 can include any device for connecting two parts of a vehicle to one another when the two parts may be changing position relative to one another, but the distance between the parts should remain constant. For example, the suspension link 102 can include a control arm, a track bar, a drag link or a tie rod. E.g., a set of suspension links 102 can be suspended between a vehicle axle and a vehicle frame in such a way as to prevent axial rotation of the axle housing while still allowing vertical articulation of the axle housing. I.e., a portion of the axle will tend to rotate under the torque created by the motor. However, if the housing of the axle is attached to the frame of the vehicle via properly configured suspension links 102 the torque of the motor will not rotate the axle housing.

FIG. 1 also shows that the suspension link 102 can include a body 104. In at least one implementation, the body 104 is the main portion of the suspension link 102. For example, if the suspension link 102 is used in conjunction with a vehicle axle the body 104 can connect the vehicle frame with the axle. In particular, on each side of the axle, suspension links 102 can be placed opposite one another on the axles and connect the axle to the frame. The body 104 can include one or more bends, allowing the suspension link 102 to connect the axle and the frame while avoiding other vehicle components.

FIG. 1 further shows that the vehicle suspension system 100 can include a control arm 106 capable of switching between a locked state and a loaded state. In automotive suspension, a control arm 106 is a hinged suspension link between the chassis and the suspension upright or hub that carries the wheel. The inboard (chassis) end of a control arm 106 is attached by a single pivot, usually a rubber bushing. It can thus control the position of the outboard end in only a single degree of freedom, maintaining the radial distance from the inboard mount. Although not deliberately free to move, the single bushing does not control the arm from moving back and forth; this motion is constrained by a separate link or radius rod. In the "radius arm" configuration of FIG. 1, the control arm 106 is attached to the suspension link 102 rather than the frame.

One of skill in the art will appreciate that a common configuration of the vehicle suspension system 100 includes four suspension links 102 attached near an axle housing. A first pair of suspension links 102 is attached below the axle housing with one of the suspension links 102 attached to the frame on the passenger side and the second of the pair attached to the frame on the driver side. A second pair is attached above the axle housing with the third suspension link 102 attached either to the frame on the passenger side or to the first suspension link in the first pair and the fourth suspension link 102 attached either to the frame on the driver side or to the second suspension link. Attachments on the top and bottom of the axle housing prevent rotation of the axle housing when torque is applied to the axle. The attachment of the fourth suspension link (or third, depending on numbering system, etc.) does not add to performance and is not strictly required. However, if the fourth suspension link 102 is not present and the third suspension link 102 fails (or vice versa) then the axle housing may rotate and the result is severe mechanical damage and/or an accident. However, the presence of the fourth suspension link 102 creates a binding effect on the joint of the suspension links 102. In particular, when one side of the axle travels upward and the opposite side travels downward (a state that is far more likely in off-road driving than on-road driving), the torsion on the suspension links 102 damages the joints. This is accommodated to some degree by rubber bushings in the joints. However, this bushing is damaged over time, leading to a reduction in vehicle suspension system 100 performance and eventual joint failure. By placing a control arm 106 in the vehicle suspension system 100 that is capable of expansion and contraction when in a loaded state, the binding and damage to the joint is removed. That is, if the control arm 106 is able to expand and contract within a constrained distance of safety, then the binding of the joints in the suspension links 102 can be entirely eliminated. Further, by placing a control arm 106 in the vehicle suspension system 100 that is capable to locking, the safety of a redundant ("fourth") suspension link 102 is achieved.

Figure 2A:
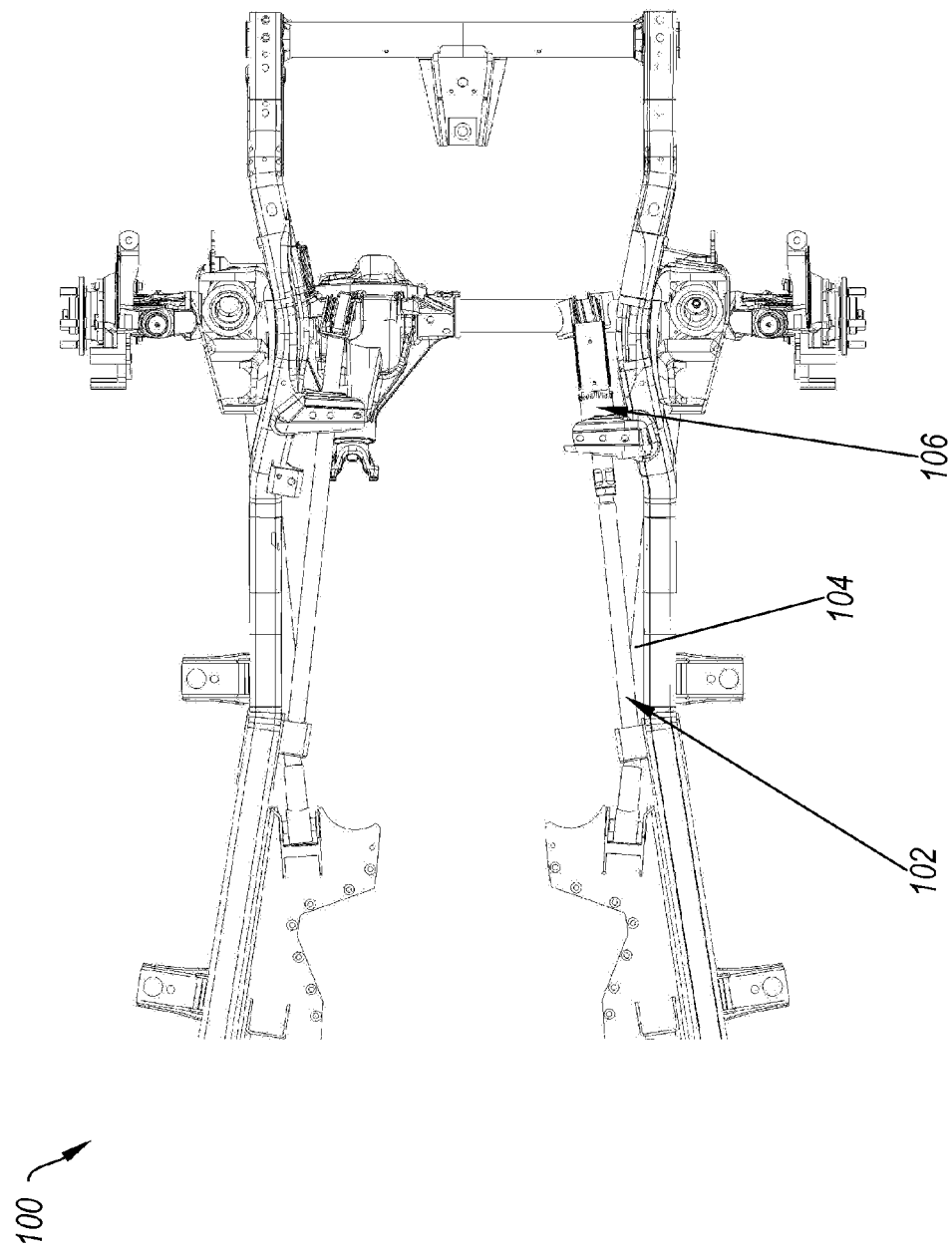
FIG. 2A illustrates a top view of an example of a vehicle suspension system.
Figure 2B:
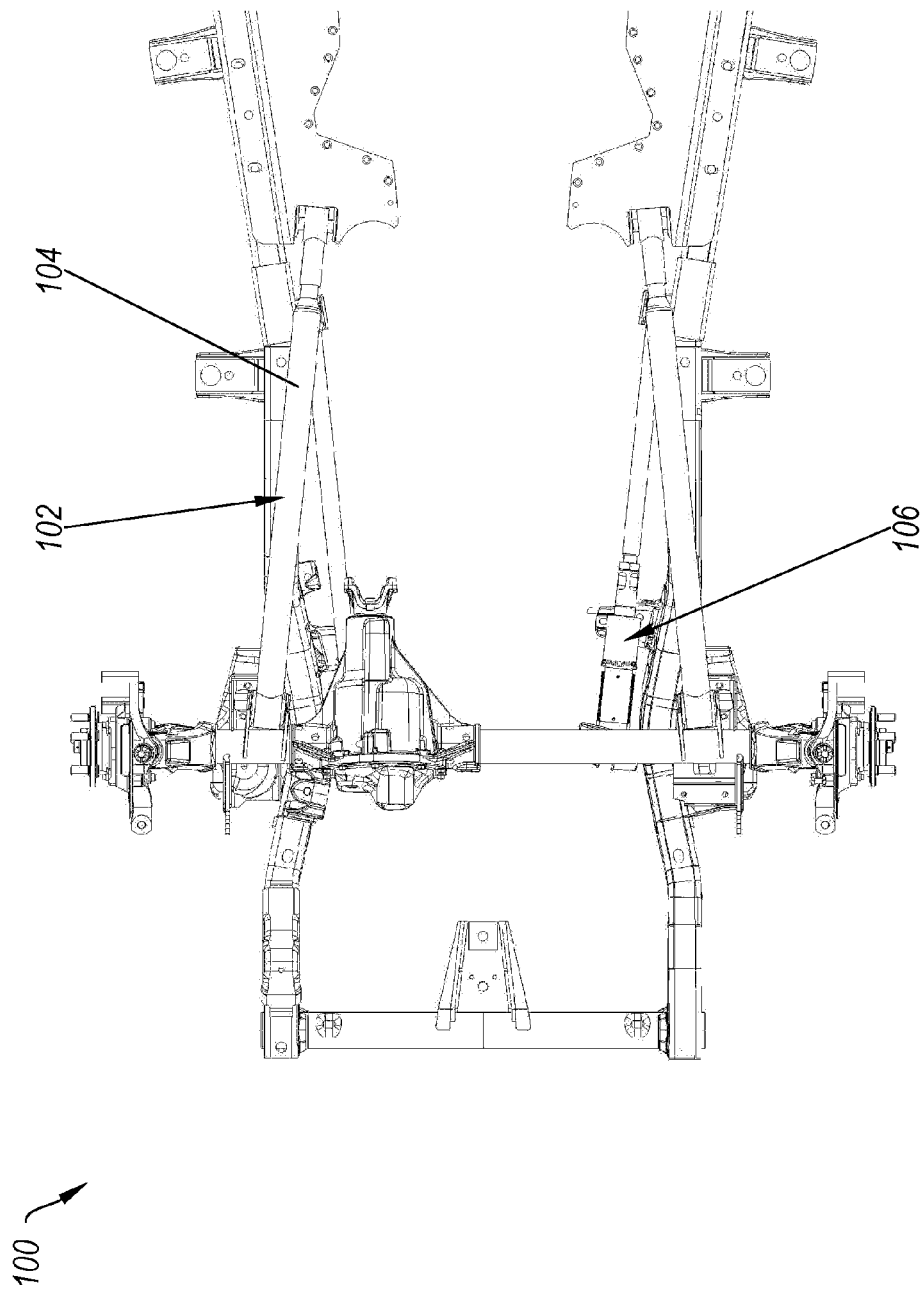
FIG. 2B illustrates a bottom view of an example of a vehicle suspension system.
Figure 2C:
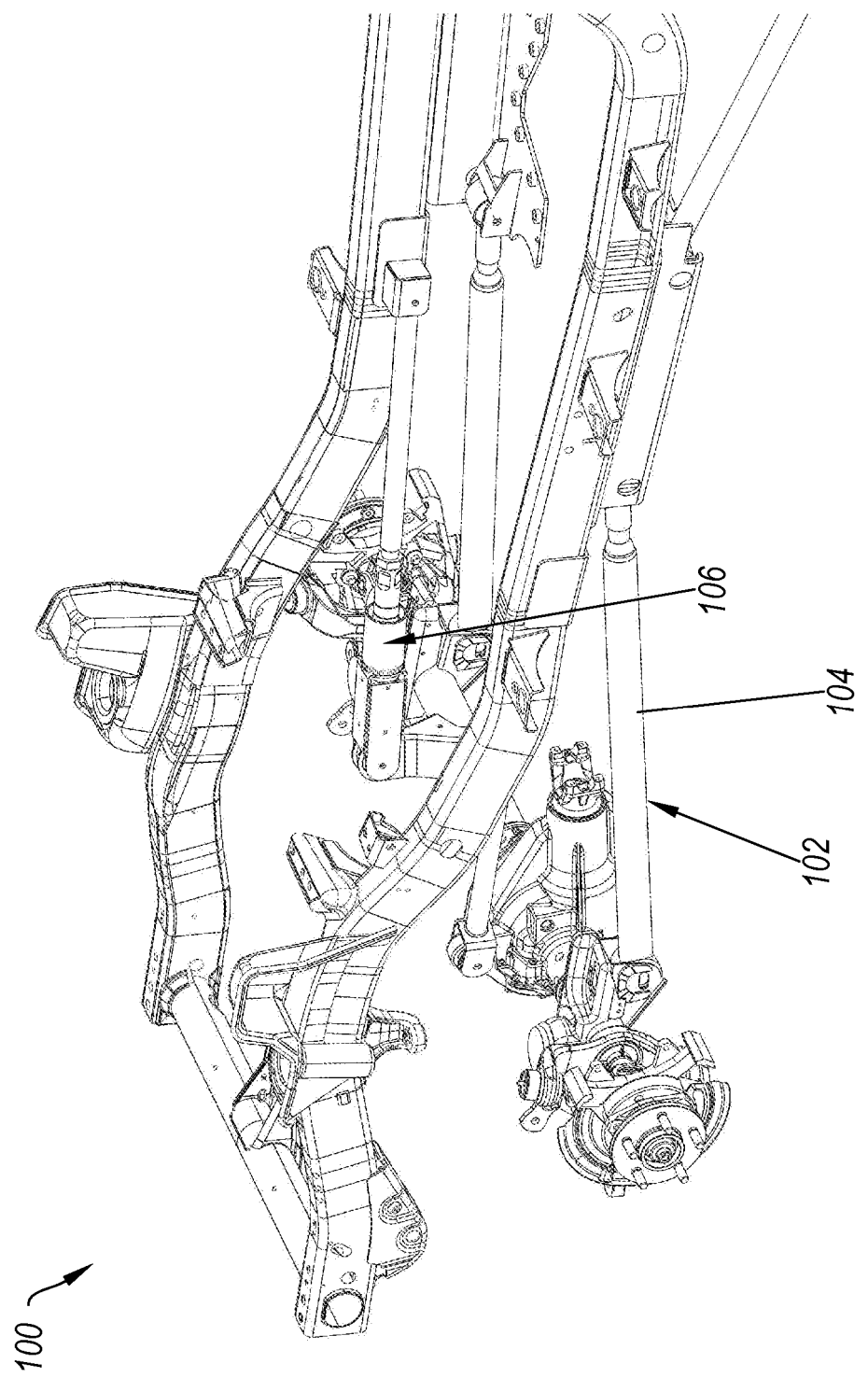
FIG. 2C illustrates a driver side view of an example of a vehicle suspension system.
Figure 2D:
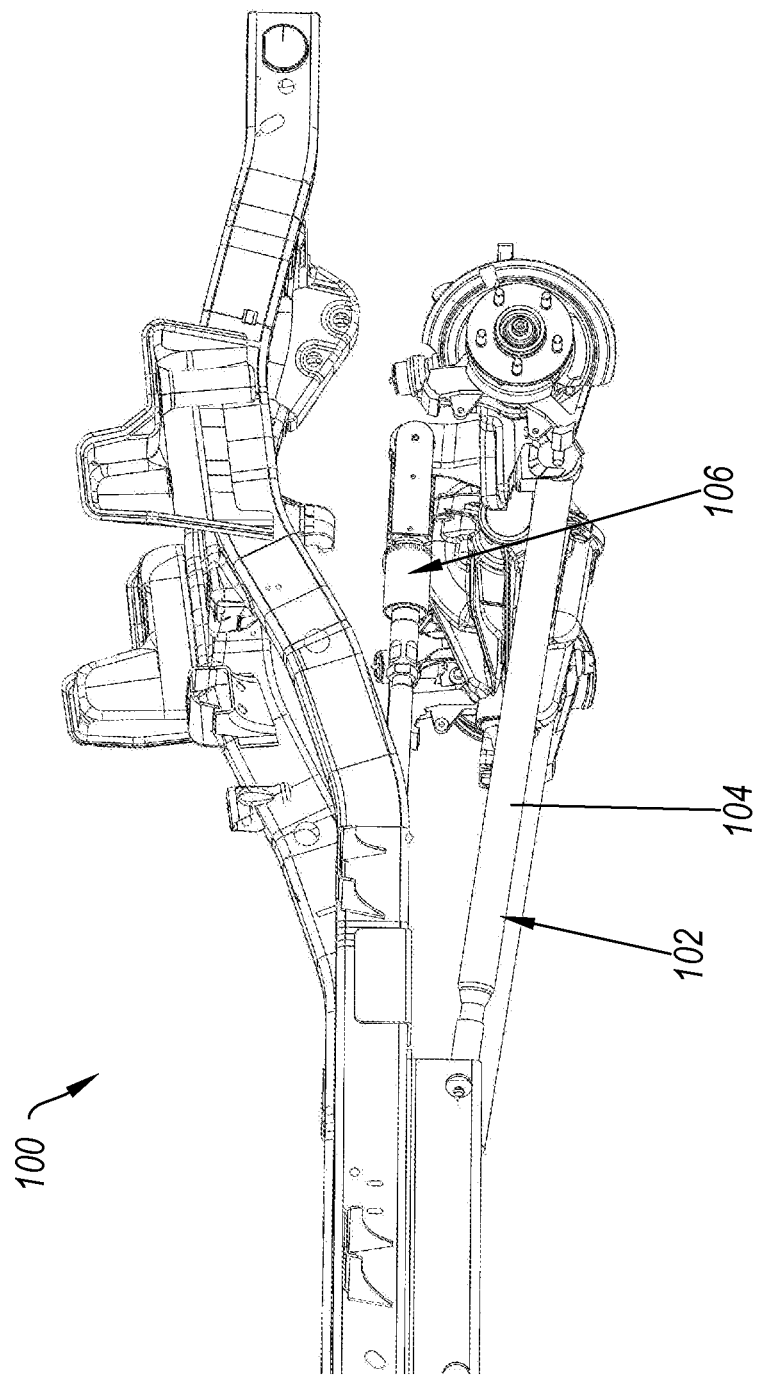
FIG. 2D illustrates a passenger side view of an example of a vehicle suspension system.

FIGS. 2A, 2B, 2C and 2D (collectively "FIG. 2") illustrate an example of a vehicle suspension system 100 in a 4-link configuration. FIG. 2A illustrates a top view of an example of a vehicle suspension system 100; FIG. 2B illustrates a bottom view of an example of a vehicle suspension system 100; FIG. 2C illustrates a driver side view of an example of a vehicle suspension system 100; and FIG. 2D illustrates a passenger side view of an example of a vehicle suspension system 100. In the "4-link" configuration of FIG. 2, the control arm 106 is attached to the vehicle frame rather than to the suspension link 102.

Figure 3:
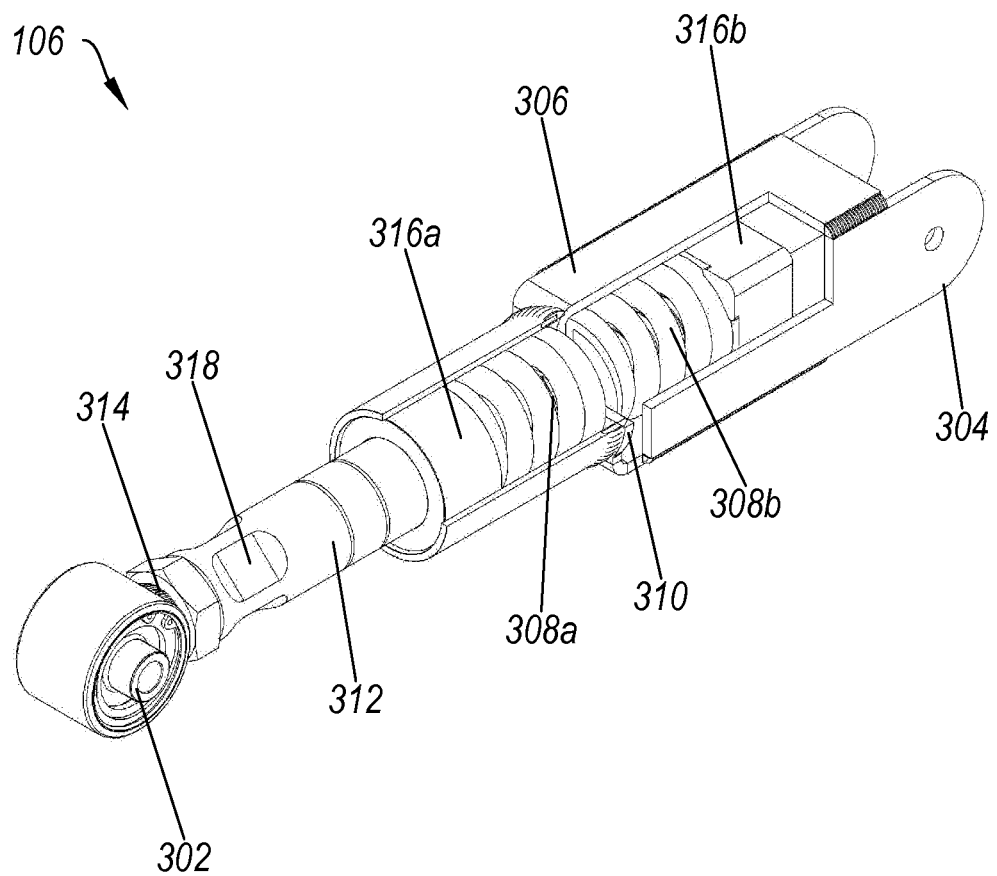
FIG. 3 illustrates a partial cut-away view an example of a control arm in a loaded state

FIG. 3 illustrates a partial cut-away view an example of a control arm 106 in a loaded state. In the loaded state, the control arm 106 is able to undergo expansion and contraction. The control arm 106 is adjusted to off-road activities in the loaded state. I.e., the control arm 106 in the loaded state is not intended for use under normal driving conditions, such as driving on roads or other hard and/or even surfaces but instead allows for more extreme activities and off-roading. That is, the control arm 106 in the loaded state acts like a shock absorber rather than a conventional control arm 106 in a vehicle used for city driving.

FIG. 3 shows that the control arm 106 can include a joint 302. The joint 302 is used as an example herein but one of skill in the art will appreciate that any desired connection can be used in place of the joint 302. The joint 302 can be used to attach the control arm 106 to an external device. For example, the joint 302 can be used to attach the control arm 106 to the suspension link 102 of FIG. 1 or to a vehicle suspension or vehicle frame. One of skill in the art will appreciate that the joint 302 can be attached to any desired external device and that a suspension and vehicle frame are an exemplary use, unless otherwise specified in the claims.

FIG. 3 also shows that the control arm 106 can include a clevis fastener 304. The clevis fastener 304 is used as an example herein but one of skill in the art will appreciate that any desired connection can be used in place of the clevis fastener 304. A clevis fastener 304 is a three-piece fastener system consisting of a clevis, clevis pin, and tang. The clevis is a U-shaped piece that has holes at the end of the prongs to accept the clevis pin. The clevis pin is similar to a bolt, but is only partially threaded or unthreaded with a cross-hole for a split pin. The tang is a piece that fits in the space within the clevis and is held in place by the clevis pin. As a part of a fastener, a clevis fastener 304 provides a method of allowing rotation in some axes while restricting rotation in others.

One of skill in the art will appreciate that although a joint 302 and a clevis fastener 304 are used herein, these attachment methods are exemplary only unless otherwise specified in the claims. That is, many types of attachment can be placed on the ends of the control arm 106 allowing it to be connected to a vehicles suspension in any desired manner.

FIG. 3 further shows that the control arm 106 can include a housing 306. The housing 306 is configured to contain the forces within the control arm 106. I.e., the housing 306 ensures that the forces within the control arm 106 do not damage the components of the control arm 106 and that they are directed in the manner intended by the control arm 106. Additionally or alternatively, the housing 306 is configured to align the other components of the control arm 106. I.e., the housing 306 can allow the internal and external components of the control arm 106 to be installed and proper spacing to be maintained among the components. As used in the specification and the claims, the phrase "configured to" denotes an actual state of configuration that fundamentally ties recited elements to the physical characteristics of the recited structure. As a result, the phrase "configured to" reaches well beyond merely describing functional language or intended use since the phrase actively recites an actual state of configuration.

FIG. 3 additionally shows that the control arm 106 can include a first spring 308a and a second spring 308b (collectively "springs 308"). The springs 308 are elastic objects used to store mechanical energy. When the springs 308 are compressed or stretched, the force they exerts are proportional to their respective change in length. I.e., the springs 308 provide a mechanical bias that tends to return the control arm 106 to its free length in the absence of external forces.

FIG. 3 additionally shows that the housing 306 can include a plate 310. The plate 310 separates two different portions of the housing 306, allowing the first spring 308a and the second spring 308b to be separated from one another, even while the first spring 308a and the second spring 308b act in concert with one another, as described below. Additionally or alternatively, the plate 310 creates a condition where the control arm can be changed from a loaded configuration to a locked configuration, as described below.

FIG. 3 moreover shows that the control arm 106 can include a shaft 312. The shaft 312 is the force transfer mechanism within the control arm 106. That is, the shaft 312 transfers compression or expansion that attempts to move the joint 302 toward or away from the clevis fastener 304 through the control arm 106. Additionally or alternatively, the shaft 312 can allow a user to change the control arm 106 from a loaded state to a locked state, as described below.

FIG. 3 also shows that the control arm 106 can include a first attachment 314. The first attachment 314 can include a threaded portion of the shaft 312, into which the joint 302 is screwed. The first attachment 314 allows the connection between the joint 302 and the shaft 312 to be customized to the exact size needed. E.g., before installation the first attachment 314 can be adjusted to customize the length of the control arm 106 between the joint 302 and the clevis fastener 304 for installation without changing the control arm 106 from a locked state to a loaded state or vice versa. Additionally or alternatively, after installation the first attachment 314 can allow a user to change the control arm 106 from a loaded state to a locked state, as described below.

FIG. 3 further shows that the control arm 106 can include a first bearing 316a and a second bearing 316b (collectively "bearings 316"). A bearing 316 is a machine element that constrains relative motion and reduces friction between moving parts to only the desired motion. The design of the bearings 316 may, for example, provide for free linear movement of the moving part or for free rotation around a fixed axis; or, it may prevent a motion by controlling the vectors of normal forces that bear on the moving parts. The bearings 316 also facilitate the desired motion as much as possible, such as by minimizing friction. Thus, the bearings 316 keep the shaft 312 centered within the housing 306 and allow the shaft 312 to rotate or move within the housing 306. In particular, the first bearing 316a and second bearing 316b remain in a fixed position relative to the shaft 312 during operation of the suspension. However, when the control arm 106 is being changed from a loaded state to a locked state, the position of the second bearing 316b is changed relative to the shaft 312, allowing the change of state, as described below.

FIG. 3 additionally shows that the control arm 106 can include wrench flats 318. The wrench flats 318 include one or more leveled areas around the outer diameter of the shaft 312 that allow it to be turned by a tool such as a wrench. I.e., during normal operation, the shaft 312 is not subjected to torque. The wrench flats 318 allow a user to induce torque to change the control arm from a loaded state to a locked state, as described below.

Figure 4:
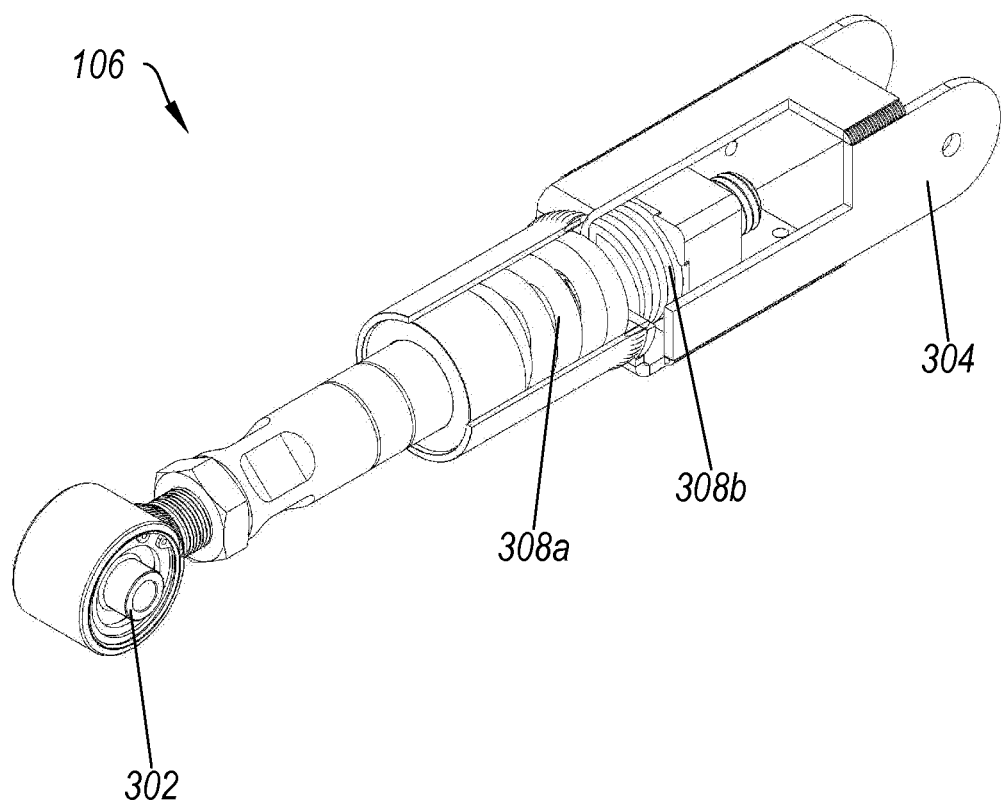
FIG. 4 illustrates a partial cut-away view of an example of a control arm in the loaded state which has been expanded.

FIG. 4 illustrates a partial cut-away view of an example of a control arm 106 in the loaded state which has been expanded. I.e., the overall length between the joint 302 and the clevis fastener 304 has been increased. FIG. 4 shows that the first spring 308a has been stretched and that the second spring 308b has been contracted. Thus, both the first spring 308a and the second spring 308b provide a mechanical force that attempts to return the control arm 106 to its resting length (i.e., shorten the control arm from its current length).

Figure 5:
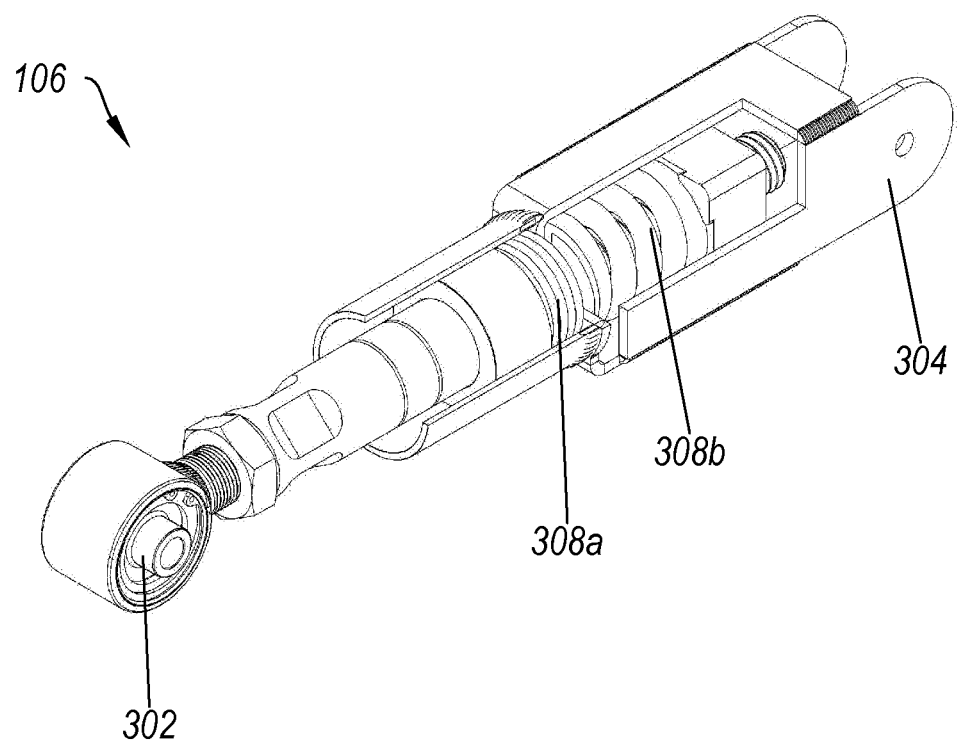
FIG. 5 illustrates a partial cut-away view of an example of a control arm in the loaded state which has been contracted.

FIG. 5 illustrates a partial cut-away view of an example of a control arm 106 in the loaded state which has been contracted. I.e., the overall length between the joint 302 and the clevis fastener 304 has been reduced. FIG. 5 shows that the first spring 308a has been contracted and that the second spring 308b has been stretched. Thus, both the first spring 308a and the second spring 308b provide a mechanical force that attempts to return the control arm 106 to its resting length (i.e., lengthen the control arm from its current length).

Figure 6A:
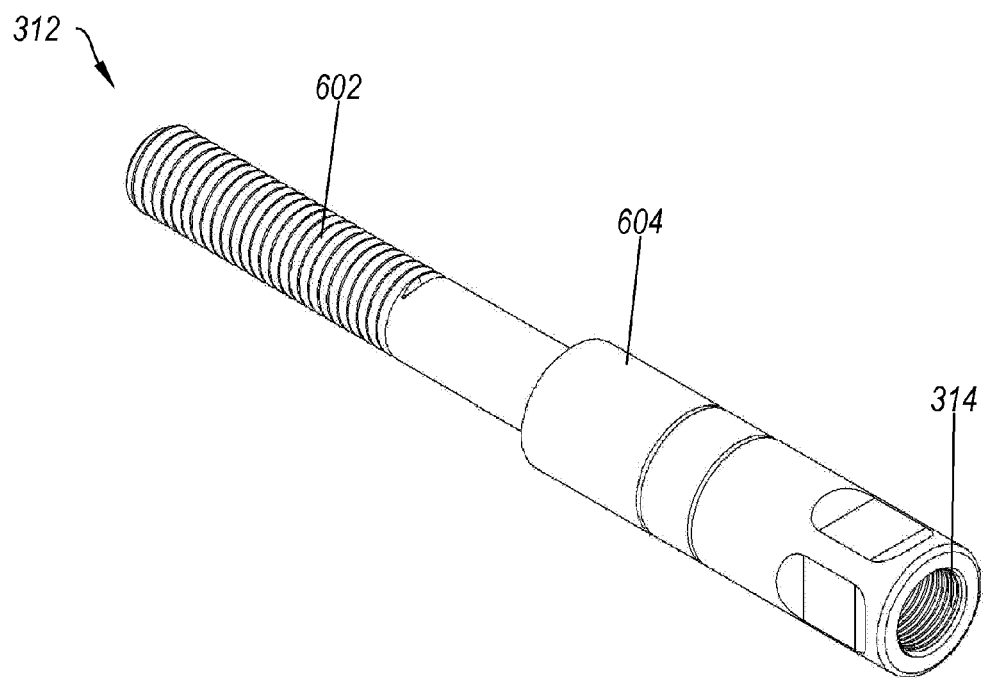
FIG. 6A illustrates a perspective view of the example of a shaft.
Figure 6B:
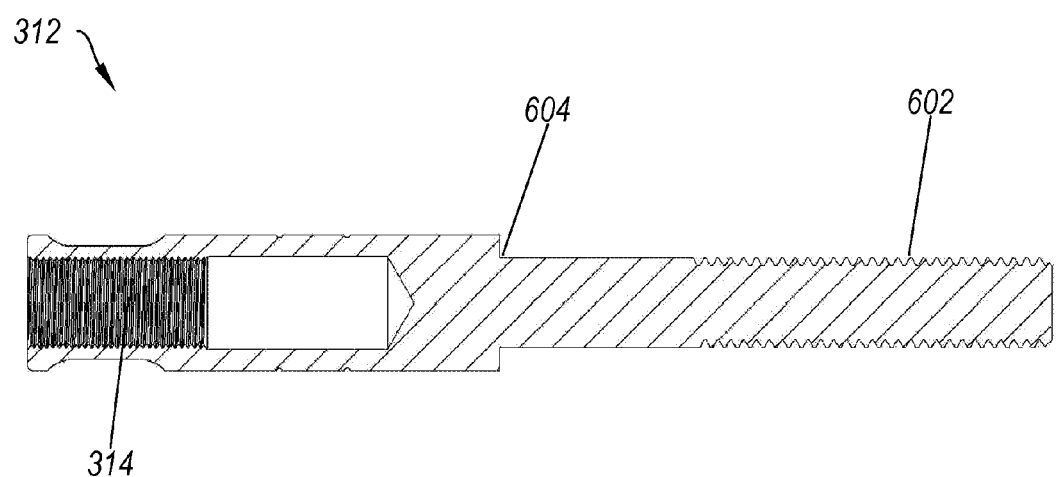
FIG. 6B illustrates a cross-sectional view of the example of a shaft.

FIGS. 6A and 6B (collectively "FIG. 6") illustrate an example of a shaft 312. FIG. 6A illustrates a perspective view of the example of a shaft 312; and FIG. 6B illustrates a cross-sectional view of the example of a shaft 312. The shaft 312 is designed to allow a control arm to be changed from a loaded state (able to expand and contract) to a locked state (unable to expand and contract) without changing the resting length of the control arm. I.e., the control arm remains the same overall length when not under external force whether it is locked or loaded.

FIG. 6 shows that the shaft 312 can include a first attachment 314. The first attachment 314 can include a threaded portion of the shaft 312, into which the joint is screwed. The first attachment 314 allows the connection between the joint and the shaft to be customized to the exact size needed. E.g., before installation the first attachment 314 can be adjusted to customize the length of the control arm 106 between the joint and the clevis fastener for installation without changing the control arm 106 from a locked state to a loaded state or vice versa. Additionally or alternatively, after installation the first attachment 314 can allow a user to change the control arm from a loaded state to a locked state, as described above.

FIG. 6 also shows that the shaft 312 can include a second attachment 602. For example, the second attachment 602 can include a threaded portion of the shaft. The second attachment 602 can then be threaded into a bearing in a control arm. The threads can allow rotation of the shaft to change the location of the shaft relative to the bearing or vice versa.

One of skill in the art will appreciate that for the control arm to change from a locked state to a loaded state and vice versa, the lead of the threads in the first attachment 314 must be greater than the lead in the second attachment 602. I.e., rotation of the shaft must move the second attachment 602 a greater distance than the first attachment 314, for reasons described below. Thread lead and thread pitch are closely related concepts. The difference between them can cause confusion, because they are equivalent for most screws. Lead is the distance along the screw's axis that is covered by one complete rotation of the screw (360°). Pitch is the distance from the crest of one thread to the next. Because the vast majority of screw threadforms are single-start threadforms, their lead and pitch are the same. Single-start means that there is only one "ridge" wrapped around the cylinder of the screw's body. Each time that the screw's body rotates one turn (360°), it has advanced axially by the width of one ridge. "Double-start" means that there are two "ridges" wrapped around the cylinder of the screw's body. Each time that the screw's body rotates one turn (360°), it has advanced axially by the width of two ridges. Another way to say the same idea is that lead and pitch are parametrically related, and the parameter that relates them, the number of starts, often has a value of 1, in which case their relationship becomes equivalence. Single start threads will be assumed herein unless otherwise specified.

Specifying the lead of a thread form can include metric based or inch based standards. For example, inch-based standards usually use threads per inch (TPI), which is how many threads occur per inch of axial screw length. Lead and TPI describe the same underlying physical property—merely in different terms. When units of measurement are constant TPI is the reciprocal of lead and vice versa. For example, a ¼-20 thread has 30 TPI, which means that its lead is ½0 inch (0.050"). Metric based standards can measure the threads per millimeter or threads per centimeter.

For example, assuming a single start thread, the lead of the first attachment 314 can be approximately 3 times the value of the lead of the second attachment 602. This means that a rotation of the shaft moves the second attachment 602 twice the distance that first attachment 314 is moved. I.e., if the lead of the first attachment 314 is 12 threads per inch, then the lead of the second attachment 602 can be 7 threads per inch. Thus, 7 rotations of the shaft 312 will result in a ½ inch change in the length of the first attachment 314 and a 1 inch change in the length of the second attachment 602. This acts to fully compress both springs in a control arm, as described below. As used in the specification and the claims, the term approximately shall mean that the value is within 10% of the stated value, unless otherwise specified.

FIG. 6 further shows that the shaft 312 can include a flange 604. The flange 604 is a ridge or lip on the shaft. The flange 604 ensures that a bearing or other object which comes in contact with the flange 604 is prevented from moving along the shaft 312. For example, the first bearing 316a of FIG. 3 is pressed by the first spring 308a against the flange 604. Thus, the bearing can move along the shaft 312 until it comes in contact with the flange 604 but then is prevented from moving any farther and the position of the bearing relative to the shaft 312 remains constant.

Figure 7B:
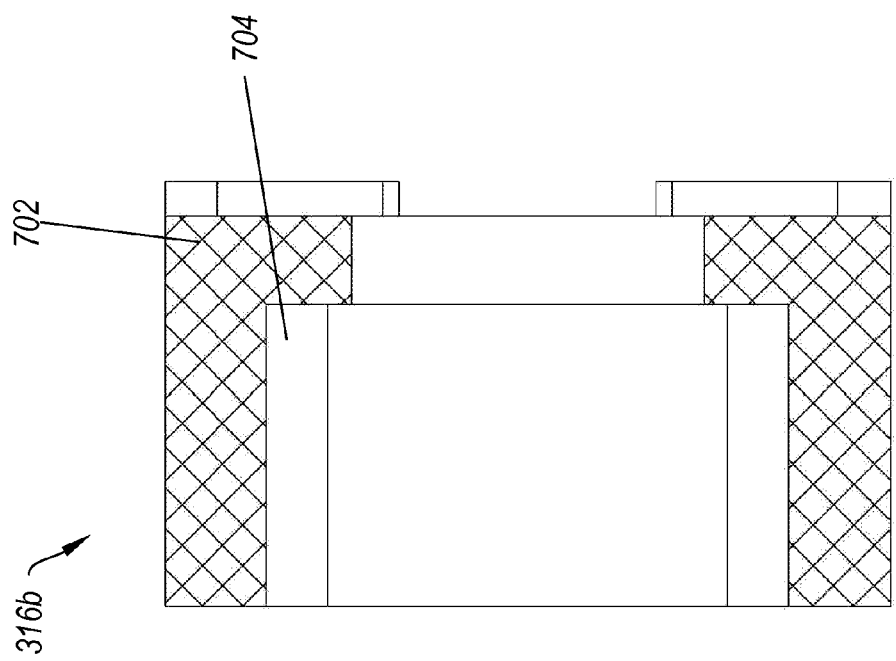
FIG. 7B illustrates a cross-sectional view of the example of a second bearing.
Figure 7A:
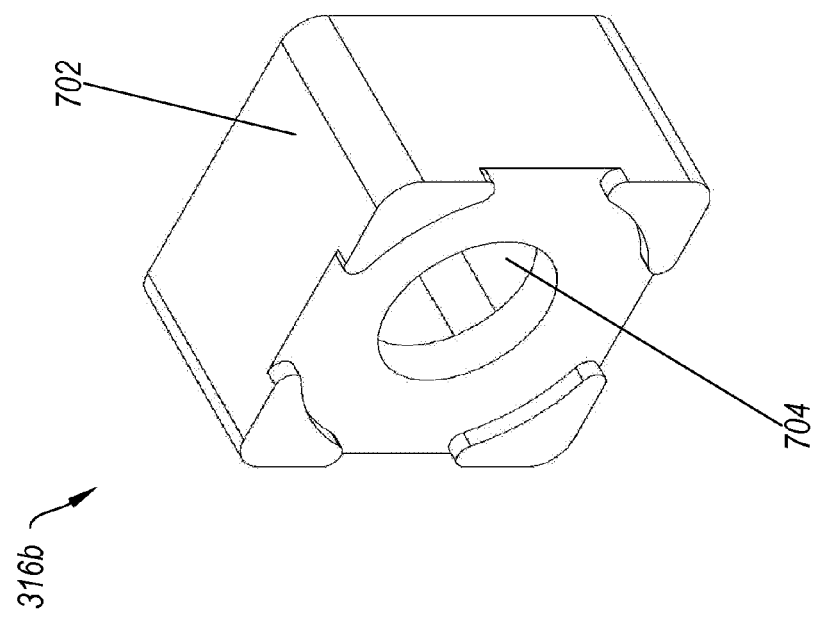
FIG. 7A illustrates a perspective view of the example of a second bearing.

FIGS. 7A and 7B (collectively "FIG. 7") illustrate an example of a second bearing 316b. FIG. 7A illustrates a perspective view of the example of a second bearing 316b; and FIG. 7B illustrates a cross-sectional view of the example of a second bearing 316b. The second bearing 316b is "fixed" in position relative to a shaft when the shaft undergoes linear movement but moves in position relative to the shaft when the shaft undergoes rotation movement (due to threads on the shaft). For example, the second bearing 316b is threaded onto the shaft, allowing it to be fixed in position in some instances and movable in other instances.

FIG. 7 shows that the second bearing 316b includes an outer portion 702. The outer portion 702 is configured to match the housing of a control arm. In particular, the outer portion 702 can be any non-circular shape which matches the housing. A non-circular shape ensures that the outer portion 702 cannot rotate within the housing. The outer portion 702 provides a force on the second spring 308b in the control arm 106 of FIG. 3.

FIG. 7 also shows that the second bearing 316b can include a nut 704. The nut 704 is configured to be threaded onto a shaft and is not rotatable relative to the outer portion 702 or the housing. Thus rotation of the shaft does not result in rotation of the nut 704 and instead "moves" the nut 704 along the threads of the shaft. Thus, forces created by the spring 308b in the control arm 106 of FIG. 3 are transmitted to linear forces on the shaft and vice versa. One of skill in the art will appreciate that the outer portion 702 and the nut 704 can be either a single piece or can be separate pieces.

Figure 8:
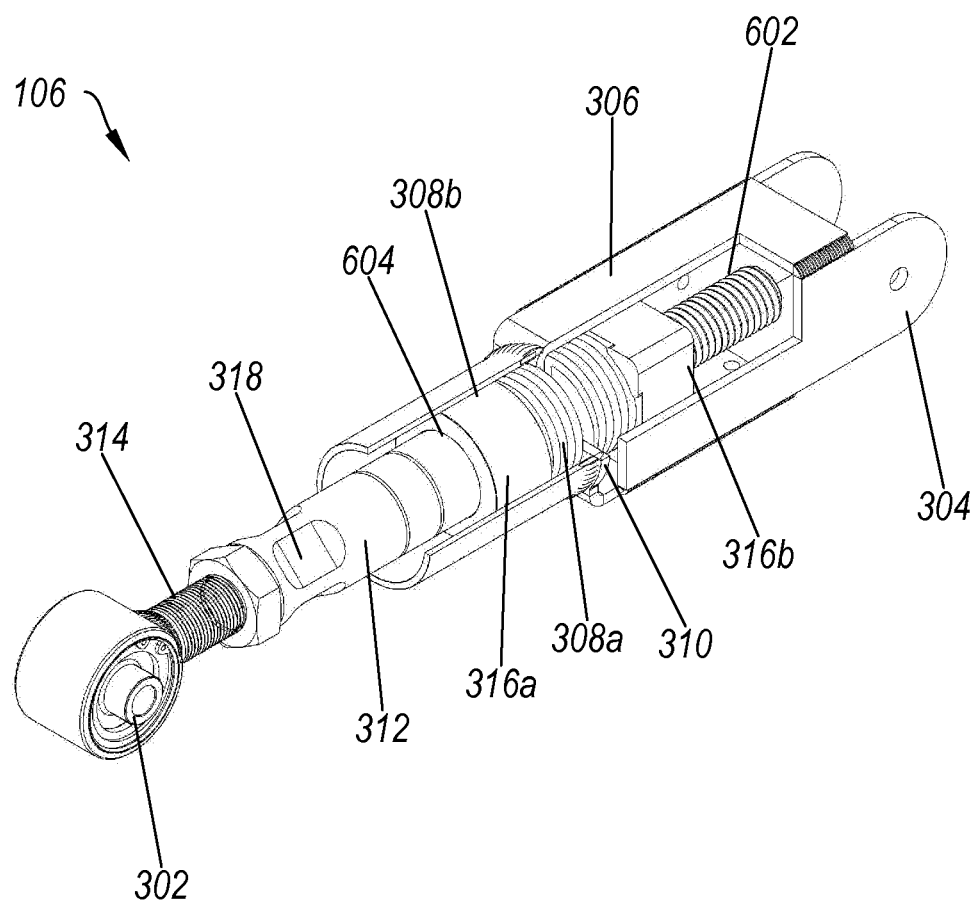
FIG. 8 illustrates an example of a control arm in a locked state.

FIG. 8 illustrates an example of a control arm 106 in a locked state. In the locked state, the control arm 106 is not able to undergo expansion and contraction and remains a fixed length. The control arm 106 is adjusted to normal activities in the locked state. I.e., the control arm 106 in the locked state can be used under normal driving conditions, such as driving on roads or other hard and/or even surfaces. That is, the control arm 106 in the locked state acts like a conventional control arm in a vehicle used for city driving. In addition, in the locked state the "stiffness" provided by the control arm 106 allows for sharper turning and better on-road performance.

FIG. 8 shows that rotation of the shaft 312, induced by a torque on the wrench flats 318, has caused the first attachment 314 to lengthen (increase the distance between the shaft 312 and the joint 302). Because the joint 302 and the clevis fastener 304 are attached at fixed points in the suspension, they should not move relative to one another during the transition from the loaded state to the locked state. Therefore, lengthening of the first attachment 314 "pushes" the shaft 312 into the housing 306 away from the joint 302 and toward the clevis fastener 304. This, in turn, pushes the first bearing 316a (which is free to rotate but remains in a fixed position relative to the shaft 312) into the first spring 308a, compressing the first spring 308a. In addition, rotation of the shaft changes the position of the second bearing 316b (which is not free to rotate), moving the second bearing 316b away from the clevis fastener 304 and toward the joint 302, compressing the second spring 308b.

Using the example above, if the lead of the first attachment 314 is 12 threads per inch and the lead of the second attachment 602 is 7 threads per inch then a single rotation of the shaft 312 moves the first attachment 314 1/12 of an inch and moves the second attachment 602 1/12 of an inch. I.e., the shaft 312 has moved toward the clevis fastener 304 1/12 of an inch, meaning that the flange 604 is 1/12 of an inch closer to the plate 310 (which is a fixed distance from the clevis fastener 304); however, the distance between the plate 310 and the second bearing 316b has also changed (because the second bearing 316b cannot rotate relative to the housing, rotation of the shaft induces linear movement of the second bearing 316b relative to the plate 310) by 1/12 of an inch. I.e., movement of the shaft 312 toward the clevis fastener 304 has "pushed" the second bearing 316a away from the plate 310 1/12 of an inch but rotation of the shaft has "pulled" the second bearing toward the plate 310 1/6 of an inch, resulting in a total displacement toward the plate 310 of 1/6 inch minus 1/12 inch equals 1/12 inch. Thus, the distance between the joint 302 and the clevis fastener 304 through one rotation of the shaft 312 does not change (it "expands" by 1/12 of an inch but is simultaneously "compressed" by 1/12 of an inch, resulting in zero net displacement). Both of these movements compress the first spring 308a and the second spring 308b equally. I.e., the first spring 308a has been compressed 1/12 of an inch and the second spring 308b has also been compressed by 1/12 of an inch, resulting in a total compression of the springs of 1/6 of an inch without any compression or expansion of the control arm 106. Further rotation of the shaft 312 results in further compression of the springs 308 until the springs 308 are fully compressed. Likewise, reverse rotation of the shaft 312 expands the springs 308.

One of skill in the art will appreciate that the rate of movement of the joint 302 and the second bearing 316b can be adjusted to control the rate of spring compression, as described above. When the first spring 316a and the second spring 308b are fully compressed, the control arm 106 is no longer able to expand and contract (loaded) and instead remains a fixed length (locked). One of skill in the art will further appreciate that partial compression of the springs 308 changes how much the control arm 106 in the loaded state is able to expand or contract. I.e., the ability of the control arm 106 to expand or contract can be adjusted to any desired value (with the limit of zero contraction or expansion being the "locked state").

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A control arm for use in a vehicle suspension, the control arm comprising:
    a first connection, the first connection configured to secure the control arm to a first external device;
    a second connection, the second connection configured to secure the control arm to a second external device;
    wherein an external force expands or contracts a distance between the first connection and the second connection within predetermined limits; and
    a mechanical bias, wherein the mechanical bias:
        returns the distance between the first connection and the second connection to a set free length when the external force is removed; and
        can be adjusted such that the control arm resists all expansion and contraction.

2. The control arm of claim 1, wherein the mechanical bias includes one or more springs.

3. The control arm of claim 1, wherein the first connection includes a joint.

4. The control arm of claim 1, wherein the second connection includes a clevis.

5. The control arm of claim 1, wherein a maximum distance between the first connection and the second connection can be adjusted.

6. The control arm of claim 5, wherein adjustment of the maximum distance does not affect the free length of the control arm.

7. The control arm of claim 1, wherein a minimum distance between the first connection and the second connection can be adjusted.

8. The control arm of claim 7, wherein adjustment of the minimum distance does not affect the free length of the control arm.

9. A control arm for use in a vehicle suspension, the control arm comprising:
    a housing;
    a first connection, the first connection configured to secure the control arm to a first external device;

a second connection, the second connection configured to secure the control arm to a second external device;
a shaft configured to transmit an external force from the first connection to the second connection;
wherein the external force expands or contracts a distance between the first connection and the second connection within predetermined limits; and
an mechanical bias, wherein the mechanical bias:
    returns the distance between the first connection and the second connection to a set free length when the external force is removed; and
    can be adjusted such that the control arm resists all expansion and contraction.

10. The control arm of claim 9, wherein a change in a magnitude of the mechanical bias does not change the free length of the control arm.

11. The control arm of claim 9, wherein the mechanical bias includes a first spring.

12. The control arm of claim 11, wherein the mechanical bias includes a second spring.

13. The control arm of claim 12 further comprising a plate between the first spring and the second spring.

14. A control arm for use in a vehicle suspension, the control arm comprising:
    a housing;
    a separator separating the housing into a first portion and a second portion;
    a first connection, the first connection configured to secure the control arm to a first external device;
    a second connection, the second connection configured to secure the control arm to a second external device;
    a shaft configured to transmit an external force from the first connection to the second connection;
    a first attachment connecting the first connection to the shaft, wherein the first attachment includes a threading with a first lead;
    a second attachment on an end of the shaft opposite the first attachment, wherein the second attachment includes a threading with a second lead;
    wherein the external force expands or contracts a distance between the first connection and the second connection within predetermined limits; and
    a first bearing in the first portion of the housing and around the shaft;
    a second bearing in the second portion of the housing and threaded on the shaft at the second attachment, wherein the second bearing may not rotate relative to the housing;
    a first mechanical bias in the first portion of the housing;
    a second mechanical bias in the second portion of the housing;
    wherein:
        rotation of the shaft in a first direction compresses both the first mechanical bias and the second mechanical bias;
        rotation of the shaft in a second direction opposite the first direction expands both the first mechanical bias and the second mechanical bias;
        the first mechanical bias and the second mechanical bias create an adjustable mechanical bias, wherein the adjustable mechanical bias:
            returns the distance between the first connection and the second connection to a set free length when the external force is removed; and
            can be adjusted to a rigid state that prevents expansion or contraction of the control arm.

15. The control arm of claim 14, wherein the second lead is twice the first lead as measured in threads per inch.

16. The control arm of claim 14, wherein the first lead includes 12 threads per inch.

17. The control arm of claim 14, wherein the second lead includes 6 threads per inch.

18. The control arm of claim 14, wherein the first attachment is connected to an axle assembly of a vehicle.

19. The control arm of claim 14, wherein:
the first mechanical bias includes a first spring; and
the second mechanical bias includes a second spring.

20. The control arm of claim 14, wherein the separator includes a plate.

* * * * *